United States Patent
Nishimura

(10) Patent No.: US 12,223,834 B2
(45) Date of Patent: Feb. 11, 2025

(54) VEHICLE-MOUNTED DEVICE, VEHICLE COMMUNICATION SYSTEM, AND ALGORITHM PROVISION METHOD

(71) Applicant: Sumitomo Electric Industries, Ltd., Osaka (JP)

(72) Inventor: Yusuke Nishimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 205 days.

(21) Appl. No.: 18/013,259

(22) PCT Filed: May 19, 2021

(86) PCT No.: PCT/JP2021/018889
§ 371 (c)(1),
(2) Date: Dec. 28, 2022

(87) PCT Pub. No.: WO2022/004168
PCT Pub. Date: Jan. 6, 2022

(65) Prior Publication Data
US 2023/0282111 A1    Sep. 7, 2023

(30) Foreign Application Priority Data
Jun. 29, 2020  (JP) .................................. 2020-111586

(51) Int. Cl.
G08G 1/0967    (2006.01)
B60W 60/00    (2020.01)

(52) U.S. Cl.
CPC ..... *G08G 1/096791* (2013.01); *B60W 60/001* (2020.02); *B60W 2556/65* (2020.02); *G08G 1/096708* (2013.01)

(58) Field of Classification Search
None
See application file for complete search history.

(56) References Cited

U.S. PATENT DOCUMENTS

| | | | |
|---|---|---|---|
| 11,475,763 B2* | 10/2022 | Ferrin | G06F 16/13 |
| 2014/0321759 A1 | 10/2014 | Kamiya | |
| 2015/0006132 A1 | 1/2015 | Matsumura | |
| 2017/0097640 A1* | 4/2017 | Wang | G05D 1/0088 |
| 2018/0158323 A1 | 6/2018 | Takenaka et al. | |

(Continued)

FOREIGN PATENT DOCUMENTS

| | | |
|---|---|---|
| JP | 2014-215877 A | 11/2014 |
| JP | 2018-10408 A | 1/2018 |

(Continued)

*Primary Examiner* — James J Lee
*Assistant Examiner* — Elizabeth Galyn Martinez
(74) *Attorney, Agent, or Firm* — XSENSUS LLP

(57) ABSTRACT

A vehicle-mounted device to be mounted on a first vehicle includes: a storage unit configured to store an algorithm related to traveling of the first vehicle; an acquisition unit configured to acquire driving environment information related to a driving environment of a second vehicle different from the first vehicle; and a determination unit configured to determine compatibility related to traveling between the driving environment information and the first vehicle, and determine, in accordance with a determination result of the compatibility, whether to provide the algorithm available for the first vehicle to the second vehicle.

16 Claims, 13 Drawing Sheets

(56) References Cited

U.S. PATENT DOCUMENTS

| | | |
|---|---|---|
| 2019/0317499 A1 | 10/2019 | Imai et al. |
| 2020/0139975 A1 | 5/2020 | Ishikawa et al. |
| 2020/0242922 A1* | 7/2020 | Dulberg ............... G08G 1/0141 |
| 2020/0369293 A1* | 11/2020 | Jeon ...................... B60W 40/08 |
| 2021/0049904 A1* | 2/2021 | Zavesky .......... G08G 1/096783 |
| 2021/0171062 A1* | 6/2021 | Hecker ............. B60W 60/0015 |
| 2022/0028254 A1* | 1/2022 | Ogawa ............. G08G 1/096716 |

FOREIGN PATENT DOCUMENTS

| | | |
|---|---|---|
| JP | 2018-24286 A | 2/2018 |
| JP | 2018-77652 A | 5/2018 |
| JP | 2018-205940 A | 12/2018 |
| JP | 2020-91704 A | 6/2020 |
| JP | 2020-93760 A | 6/2020 |
| WO | 2013/108752 A1 | 7/2013 |

\* cited by examiner

| ALGORITHM IDENTIFIER | DRIVING ENVIRONMENT CONDITION | EVALUATION VALUE |
|---|---|---|
| ALGORITHM A | EXPRESSWAY | 100 |
| ALGORITHM A | GENERAL ROAD | 60 |
| ALGORITHM B | EXPRESSWAY | 80 |
| ALGORITHM B | GENERAL ROAD | 90 |

VEHICLE-MOUNTED DEVICE, VEHICLE COMMUNICATION SYSTEM, AND ALGORITHM PROVISION METHOD

CROSS-REFERENCE TO RELATED APPLICATIONS

The present application is based on PCT filing PCT/JP2021/018889, filed May 19, 2021, which claims priority to JP 2020-111586, filed Jun. 29, 2020, the entire contents of each are incorporated herein by reference.

TECHNICAL FIELD

The present disclosure relates to a vehicle-mounted device, a vehicle communication system, and an algorithm provision method. The present application claims priority based on Japanese Patent Application No. 2020-111586, filed on Jun. 29, 2020, and the entire contents of the Japanese patent application are incorporated herein by reference.

BACKGROUND ART

PTL 1 discloses a vehicle-mounted device that predicts a future position of a moving body such as another vehicle, a pedestrian, or a two-wheeled vehicle that is present around a host vehicle. The vehicle-mounted device acquires external information during actual traveling and recognizes a driving environment such as the number of pedestrians around the host vehicle. The vehicle-mounted device determines an appropriate prediction model from a prediction model of the moving body prepared in advance in the host vehicle according to the acquired driving environment, and predicts the behavior of the moving body.

PTL 2 discloses a vehicle-mounted device that detects a detection target such as a person or another vehicle that is present in front of or behind a vehicle by image recognition. The vehicle-mounted device specifies a distance to a target in an input image captured by a camera or the like and a state of light in the input image. The vehicle-mounted device performs image recognition processing corresponding to the specified distance and state of light on the input image, and detects the detection object from the input image.

PTL 3 discloses a vehicle-mounted device having both a dynamically changing algorithm such as machine learning or artificial intelligence and a prescribed algorithm in accordance with traffic rules or in which upper and lower limit values of a control amount are determined in advance. The vehicle-mounted device performs autonomous driving in a complicated environment and vehicle control reflecting personal preference by the dynamically changing algorithm. The vehicle-mounted device controls the vehicle if the dynamically changing algorithm makes an unexpected determination according to the prescribed algorithm.

PTL 4 discloses a vehicle-mounted device that performs adjustment in advance by communication between a host vehicle and another vehicle so that avoidance control in the host vehicle for avoiding occurrence of an accident does not conflict with that in the other vehicle. Based on information related to a driving situation and autonomous driving control content of the host vehicle and information related to a driving situation and autonomous driving control content acquired from the other vehicle, the vehicle-mounted device controls autonomous driving of the other vehicle.

CITATION LIST

Patent Literature

PTL 1: Japanese Unexamined Patent Application Publication No. 2018-205940
PTL 2: Japanese Unexamined Patent Application Publication No. 2014-215877
PTL 3: Japanese Unexamined Patent Application Publication No. 2018-24286
PTL 4: Japanese Unexamined Patent Application Publication No. 2018-77652

SUMMARY OF INVENTION

A vehicle-mounted device according to the present disclosure is a vehicle-mounted device to be mounted on a first vehicle, and includes: a storage unit configured to store an algorithm related to traveling of the first vehicle; an acquisition unit configured to acquire driving environment information related to a driving environment of a second vehicle different from the first vehicle; and a determination unit configured to determine compatibility related to traveling between the driving environment information and the first vehicle, and determine, in accordance with a determination result of the compatibility, whether to provide the algorithm available for the first vehicle to the second vehicle.

A vehicle communication system according to the present disclosure includes: a first vehicle-mounted device to be mounted on a first vehicle; and a second vehicle-mounted device to be mounted on a second vehicle different from the first vehicle, in which the second vehicle-mounted device transmits driving environment information related to a driving environment of the second vehicle to the first vehicle-mounted device, and the first vehicle-mounted device receives the driving environment information, and transmits, based on the received driving environment information, a first algorithm available for the first vehicle among algorithms related to traveling of the first vehicle, the algorithms being stored in the first vehicle-mounted device, to the second vehicle-mounted device.

An algorithm provision method according to the present disclosure is an algorithm provision method in a vehicle-mounted device to be mounted on a first vehicle, and includes: acquiring driving environment information related to a driving environment of a second vehicle different from the first vehicle; and determining compatibility related to traveling between the driving environment information and the first vehicle, and determining, in accordance with a determination result of the compatibility, whether to provide a first algorithm available for the first vehicle among algorithms related to traveling of the first vehicle, the algorithms being stored in the vehicle-mounted device, to the second vehicle.

Another algorithm provision method according to the present disclosure is an algorithm provision method in a vehicle communication system including a first vehicle-mounted device to be mounted on a first vehicle and a second vehicle-mounted device to be mounted on a second vehicle different from the first vehicle, and includes: transmitting, by the second vehicle-mounted device, driving environment information related to a driving environment of the second vehicle to the first vehicle-mounted device; and receiving, by the first vehicle-mounted device, the driving environment information, and transmitting, by the first vehicle-mounted device, based on the received driving environment information, a first algorithm available for the first vehicle among algorithms related to traveling of the first vehicle, the algorithms being stored in the first vehicle-mounted device, to the second vehicle-mounted device.

An aspect of the present disclosure can be implemented as a semiconductor integrated circuit that implements a part or all of a vehicle-mounted device.

DESCRIPTION OF EMBODIMENTS

Figure 1:
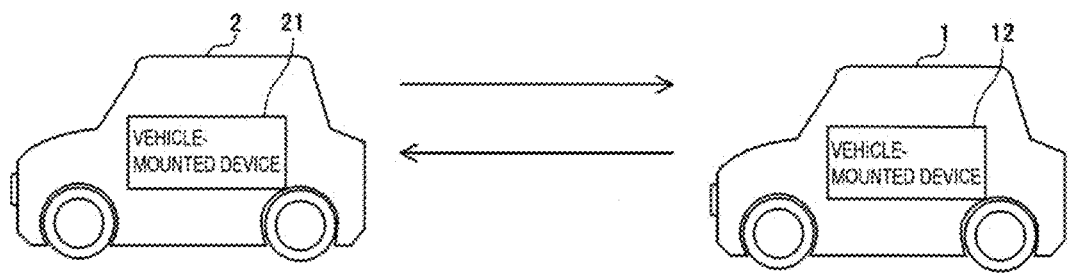
FIG. 1 is a diagram illustrating a configuration of a vehicle communication system according to a first embodiment of the present disclosure.

In recent years, vehicle-mounted devices having various functions have been developed in order to implement autonomous driving of vehicles.

[Problems to be Solved by Present Disclosure]

Various services such as autonomous driving and entertainment are provided in a vehicle. An optimal algorithm for implementing a certain service may differ depending on a driving environment.

The present disclosure has been made to solve the above-described problem, and an object thereof is to provide a vehicle-mounted device, a communication system, and a communication method capable of providing a service more effectively in accordance with a driving environment of a vehicle.

[Advantageous Effects of Present Disclosure]

According to the present disclosure, it is possible to provide a service more effectively in accordance with a driving environment of a vehicle.

[Description of Embodiments of Present Application Invention]

First, details of embodiments of the present disclosure will be listed and described.

(1) A vehicle-mounted device according to an embodiment of the present disclosure is a vehicle-mounted device to be mounted on a first vehicle, including: a storage unit configured to store an algorithm related to traveling of the first vehicle; an acquisition unit configured to acquire driving environment information related to a driving environment of a second vehicle different from the first vehicle; and a determination unit configured to determine compatibility related to traveling between the driving environment information and the first vehicle, and determine, in accordance with a determination result of the compatibility, whether to provide the algorithm available for the first vehicle to the second vehicle.

An algorithm for implementing a service such as autonomous driving is stored in advance in a vehicle-mounted device to be mounted on a vehicle. However, an optimal algorithm for implementing various services may differ depending on a driving environment of the vehicle. Therefore, it is difficult to provide an optimum service under various driving environments by the vehicle-mounted device using the algorithm stored in advance. On the other hand, according to the configuration in which the determination unit in the vehicle-mounted device determines whether to provide the algorithm related to traveling of the vehicle to the second vehicle, the algorithm suitable for the driving environment in which the second vehicle is placed can be provided to the second vehicle as necessary. Therefore, it is possible to provide a service more effectively in accordance with the driving environment of the vehicle.

(2) The storage unit may further store first vehicle information indicating whether the first vehicle is a commercial vehicle, and the determination unit may determine compatibility between the driving environment information and the first vehicle information.

A commercial vehicle such as a route bus and a taxi frequently travels in a certain specific area. If the commercial vehicle holds a learning algorithm, the algorithm collects relatively much information of the area and has high performance. Therefore, if the commercial vehicle provides the algorithm to the second vehicle, even if the second vehicle travels in the area for the first time, the second vehicle can be provided with a high quality service.

(3) A number of algorithms available for the first vehicle may vary depending on the driving environment, and, based on a driving environment information, the determination unit may determine the number of algorithms to be provided to the second vehicle.

According to such a configuration, the second vehicle can obtain an optimum number of algorithms according to the driving environment, and can be provided with a service of higher quality in accordance with the driving environment of the vehicle.

(4) Based on the determination result obtained by the determination unit, the vehicle-mounted device may provide the algorithm to the second vehicle.

According to such a configuration, it is possible to provide the algorithm suitable for the driving environment in which the second vehicle is placed to the second vehicle as necessary. Therefore, it is possible to provide a service more effectively in accordance with the driving environment of the vehicle.

(5) A vehicle communication system according to this embodiment includes: a first vehicle-mounted device to be mounted on a first vehicle; and a second vehicle-mounted device to be mounted on a second vehicle different from the first vehicle, in which the second vehicle-mounted device transmits driving environment information related to a driving environment of the second vehicle to the first vehicle-mounted device, and the first vehicle-mounted device receives the driving environment information, and transmits, based on the received driving environment information, a first algorithm available for the first vehicle among algorithms related to traveling of the first vehicle, the algorithms being stored in the first vehicle-mounted device, to the second vehicle-mounted device.

An algorithm for implementing a service such as autonomous driving is stored in advance in a vehicle-mounted device to be mounted on a vehicle. However, an optimal algorithm for implementing various services may differ depending on a driving environment of the vehicle. Therefore, it is difficult to provide an optimum service under various driving environments by the vehicle-mounted device using the algorithm stored in advance. On the other hand, according to the configuration in which the first vehicle-mounted device in the first vehicle transmits the algorithm related to traveling of the vehicle to the second vehicle-mounted device in the second vehicle, the algorithm suitable for the driving environment in which the second vehicle is placed can be provided to the second vehicle as necessary. Therefore, it is possible to provide a service more effectively in accordance with the driving environment of the vehicle.

(6) A third vehicle-mounted device to be mounted on a third vehicle different from the first vehicle and the second vehicle may be further included, in which the third vehicle-mounted device may receive the driving environment information, and transmit, based on the received driving environment information, a third algorithm available for the third vehicle among algorithms related to traveling of the third vehicle, the algorithms being stored in the third vehicle-mounted device, to the second vehicle-mounted device, and the second vehicle-mounted device may select and use one of the first algorithm received from the first vehicle-mounted device and the third algorithm received from the third vehicle-mounted device.

According to such a configuration, the second vehicle can be provided with algorithms from the plurality of vehicles, and can select and use an algorithm more suitable for the driving environment of the second vehicle. Therefore, it is possible to be provided with a service with higher quality in accordance with the driving environment of the vehicle.

(7) An algorithm provision method according to this embodiment is an algorithm provision method in a vehicle-mounted device to be mounted on a first vehicle, and includes: acquiring driving environment information related to a driving environment of a second vehicle different from the first vehicle; and determining compatibility related to traveling between the driving environment information and the first vehicle, and determining, in accordance with a determination result of the compatibility, whether to provide a first algorithm available for the first vehicle among algorithms related to traveling of the first vehicle, the algorithms being stored in the vehicle-mounted device, to the second vehicle.

An algorithm for implementing a service such as autonomous driving is stored in advance in a vehicle-mounted device to be mounted on a vehicle. However, an optimal algorithm for implementing various services may differ depending on a driving environment of the vehicle. Therefore, it is difficult to provide an optimum service under various driving environments by the vehicle-mounted device using the algorithm stored in advance. On the other hand, according to the configuration in which it is determined whether to provide the algorithm available for the first vehicle and related to traveling of the vehicle to the second vehicle, the algorithm suitable for the driving environment in which the second vehicle is placed can be provided to the second vehicle as necessary. Therefore, it is possible to provide a service more effectively in accordance with the driving environment of the vehicle.

(8) An algorithm provision method according to this embodiment is an algorithm provision method in a vehicle communication system including a first vehicle-mounted device to be mounted on a first vehicle and a second vehicle-mounted device to be mounted on a second vehicle different from the first vehicle, and includes: transmitting, by the second vehicle-mounted device, driving environment information related to a driving environment of the second vehicle to the first vehicle-mounted device; and receiving, by the first vehicle-mounted device, the driving environment information, and transmitting, by the first vehicle-mounted device, based on the received driving environment information, a first algorithm available for the first vehicle among algorithms related to traveling of the first vehicle, the algorithms being stored in the first vehicle-mounted device, to the second vehicle-mounted device.

An algorithm for implementing a service such as autonomous driving is stored in advance in a vehicle-mounted device to be mounted on a vehicle. However, an optimal algorithm for implementing various services may differ depending on a driving environment of the vehicle. Therefore, it is difficult to provide an optimum service under various driving environments by the vehicle-mounted device using the algorithm stored in advance. On the other hand, according to the configuration in which the first vehicle-mounted device in the first vehicle transmits the algorithm related to traveling of the vehicle to the second vehicle-mounted device in the second vehicle, the algorithm suitable for the driving environment in which the second vehicle is placed can be provided to the second vehicle as necessary. Therefore, it is possible to provide a service more effectively in accordance with the driving environment of the vehicle.

Now, the embodiments of the present disclosure will be described below with reference to the drawings. In the drawings, the same or corresponding portions are denoted by the same reference numerals, and a description thereof will not be repeated. Furthermore, at least a part of the embodiments described below may be arbitrarily combined.

First Embodiment

[Vehicle Communication System]

FIG. 1 is a diagram illustrating a configuration of a vehicle communication system according to a first embodiment of the present disclosure.

Referring to FIG. 1, a vehicle communication system 100 includes a vehicle-mounted device 12 mounted on a host vehicle (first vehicle) 1 and a vehicle-mounted device 21 mounted on another vehicle (second vehicle) 2. The host vehicle 1 and the other vehicle 2 are, for example, four-wheeled vehicles. The vehicle-mounted device 12 can perform wireless communication with the vehicle-mounted device 21 by using mobile communication, short-range wireless communication, or the like. The vehicle-mounted device 12 constitutes a vehicle-mounted network in the host vehicle 1 together with other vehicle-mounted devices, and the like.

[Vehicle-Mounted Network]

Figure 2:
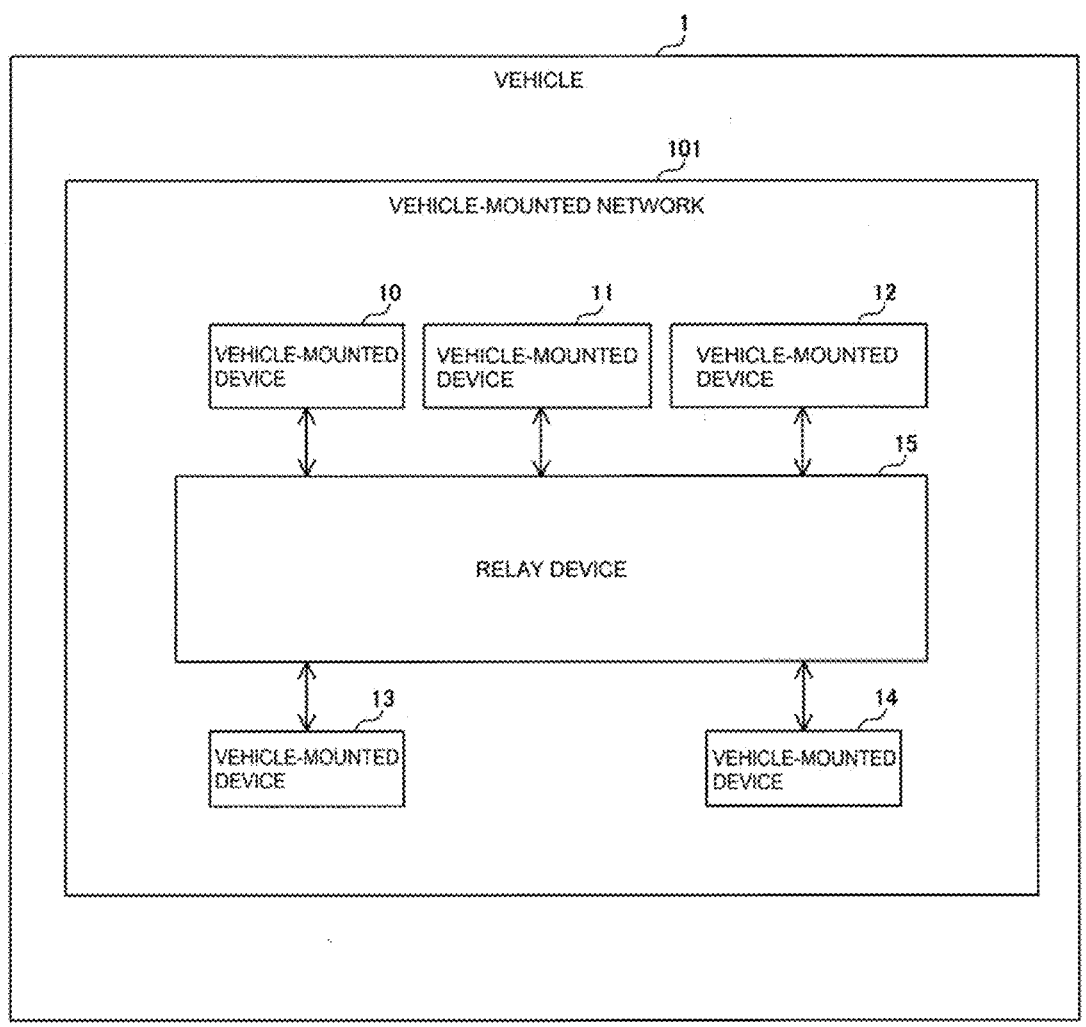
FIG. 2 is a diagram illustrating a configuration of a vehicle-mounted network of a host vehicle according to the first embodiment of the present disclosure.

FIG. 2 is a diagram illustrating a configuration of the vehicle-mounted network of the host vehicle according to the first embodiment of the present disclosure.

Referring to FIG. 2, the host vehicle 1 includes a plurality of vehicle-mounted devices (first vehicle-mounted device) 10 to 14 and a relay device 15.

In a vehicle-mounted network 101, the vehicle-mounted devices 10 to 14 are connected to the relay device 15 via Ethernet (registered trademark) cables.

The relay device 15 is, for example, a central gateway (CGW). The relay device 15 can communicate with the vehicle-mounted devices 10 to 14 connected to the relay device 15. The relay device 15 can relay data among the plurality of vehicle-mounted devices 10 to 14 connected to the relay device 15.

The relay device 15 performs relay processing of an Ethernet frame in accordance with the Ethernet communication standard. Specifically, the relay device 15 relays, for example, Ethernet frames exchanged between the vehicle-mounted devices 10 to 14. An IP packet is stored in the Ethernet frame.

The vehicle-mounted network is not limited to a configuration of performing Ethernet frame relaying in accordance with the Ethernet communication standard, and may be a configuration of performing data relaying in accordance with a communication standard such as CAN (Controller Area Network) (registered trademark), FlexRay (registered trademark), MOST (Media Oriented Systems Transport) (registered trademark), and LIN (Local Interconnect Network).

As in the host vehicle 1, the vehicle-mounted device 21 in the other vehicle 2 constitutes a vehicle-mounted network together with other vehicle-mounted devices, and the like. Since the configuration of the vehicle-mounted network of the other vehicle 2 is substantially the same as that of the vehicle-mounted network of the host vehicle 1, a detailed description thereof will not be given.

Next, the vehicle-mounted devices of each vehicle will be described.

[Vehicle-Mounted Devices of Host Vehicle]

Figure 3:
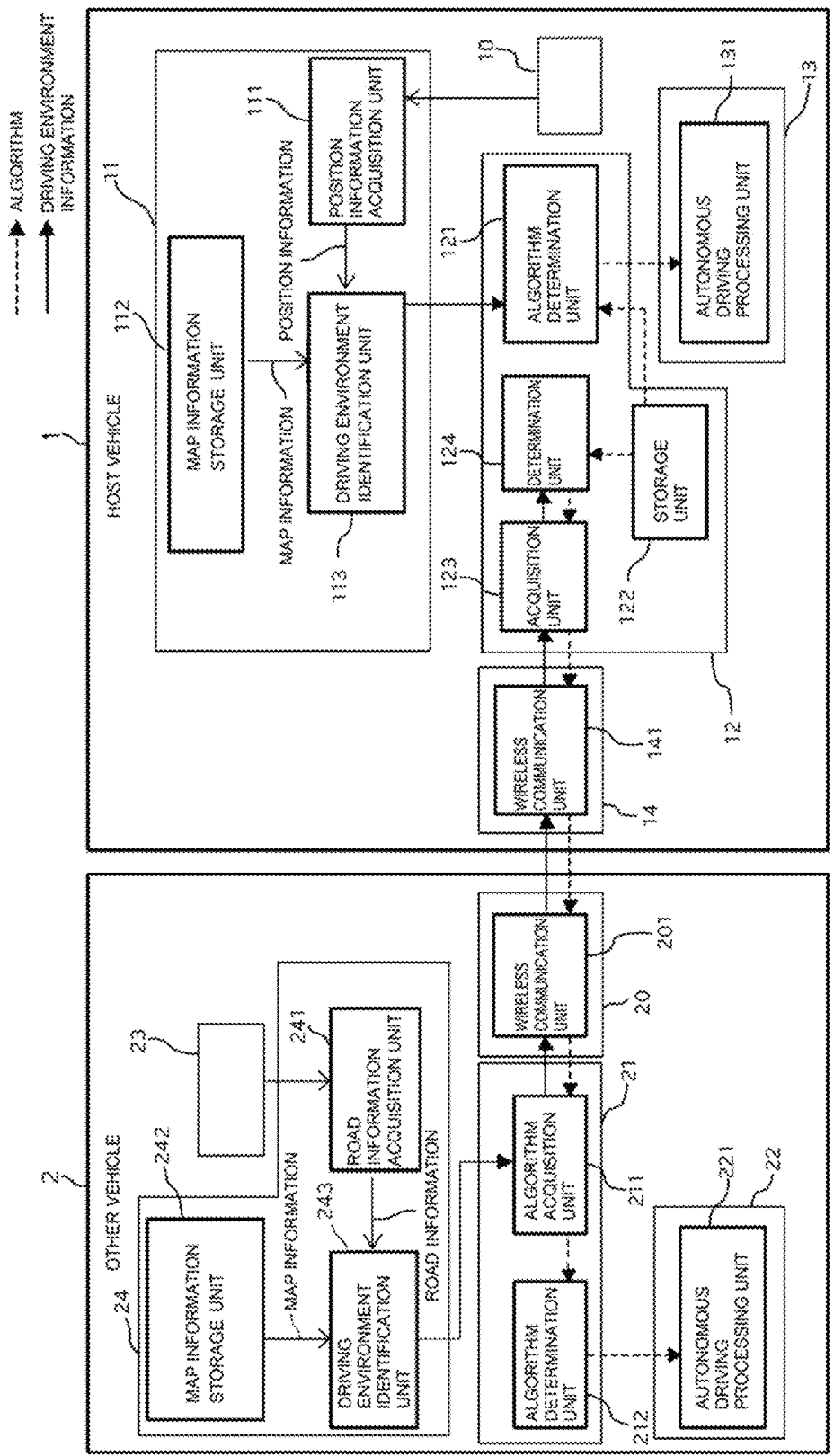
FIG. 3 is a diagram illustrating a configuration of vehicle-mounted devices according to the first embodiment of the present disclosure.

FIG. 3 is a diagram illustrating a configuration of vehicle-mounted devices according to the first embodiment of the present disclosure.

Referring to FIG. 3, the vehicle-mounted device 10 is, for example, a GPS (global positioning system) receiver. The vehicle-mounted device 10 acquires the current position of the host vehicle 1 based on radio waves from positioning satellites of a GNSS (global navigation satellite system) including the GPS, and generates position information indicating the acquired current position. The vehicle-mounted device 10 transmits the generated position information to the vehicle-mounted device 11. Note that the vehicle-mounted device 10 may generate the position information based on measurement results of a roadside unit 60. The roadside unit 60 is, for example, a camera, LiDAR (Light Detection and Ranging), and the like.

The vehicle-mounted device 11 is, for example, an ECU (Electronic Control Unit) for detecting the driving environment. The vehicle-mounted device 11 determines the driving environment of the host vehicle 1 based on the position information received from the vehicle-mounted device 10. The vehicle-mounted device 11 includes a position information acquisition unit 111, a map information storage unit 112, and a driving environment identification unit 113.

The position information acquisition unit 111 receives the position information from the vehicle-mounted device 10 and outputs the position information to the driving environment identification unit 113.

The map information storage unit 112 stores road map information of an area where the host vehicle 1 is assumed to travel. The map information storage unit 112 is, for example, a flash memory.

Upon receiving the position information from the position information acquisition unit 111, the driving environment identification unit 113 acquires information of an area corresponding to the position information from the road map information stored in the map information storage unit 112. The driving environment identification unit 113 determines the driving environment of the host vehicle 1 based on the position information and the information of the area, and generates driving environment information. For example, the driving environment information includes information indicating whether the host vehicle 1 is traveling on an expressway or a general road. The driving environment identification unit 113 transmits the generated driving environment information to the vehicle-mounted device 12.

The vehicle-mounted device 12 is, for example, an ECU for determining an algorithm. The vehicle-mounted device 12 includes an algorithm determination unit 121 and a storage unit 122. The storage unit 122 is, for example, a flash memory, and stores a plurality of algorithms. The plurality of algorithms include an algorithm related to traveling of the host vehicle 1.

Upon receiving the driving environment information, the algorithm determination unit 121 acquires an algorithm corresponding to the driving environment information from among the plurality of algorithms stored in the storage unit 122. The algorithm determination unit 121 selects an algorithm available for autonomous driving based on the acquired driving environment information, and transmits the selected algorithm to the vehicle-mounted device 13.

The vehicle-mounted device 13 is, for example, an autonomous driving ECU. The vehicle-mounted device 13 includes an autonomous driving processing unit 131.

Upon receiving the algorithm from the algorithm determination unit 121, the autonomous driving processing unit 131 performs autonomous driving of the host vehicle 1 based on the algorithm.

The vehicle-mounted device 14 is, for example, a TCU (Telematics Communication Unit). The vehicle-mounted device 14 includes a wireless communication unit 141.

The wireless communication unit 141 can communicate with a wireless communication unit 201 in a vehicle-mounted device 20 of the other vehicle 2. The wireless communication unit 141 is implemented by a communication circuit such as a communication IC (integrated circuit).

Here, the vehicle-mounted device 12 further includes an acquisition unit 123 and a determination unit 124.

[Acquisition Unit]

The acquisition unit 123 acquires other vehicle information including driving environment information related to the driving environment of the other vehicle 2. More specifically, the acquisition unit 123 receives the other vehicle information from the other vehicle 2 via the wireless communication unit 141, and outputs the received other vehicle information to the determination unit 124.

[Determination Unit]

The determination unit 124 determines compatibility between the other vehicle information and the host vehicle 1. More specifically, upon receiving the other vehicle information from the acquisition unit 123, the determination unit 124 refers to an evaluation value table stored in the storage unit 122. In the evaluation value table, host vehicle information related to the driving environment of the host vehicle 1 is registered. Note that the compatibility between the other vehicle information and the host vehicle 1 includes compatibility related to traveling between the other vehicle information and the host vehicle 1.

Figures 4, 5:
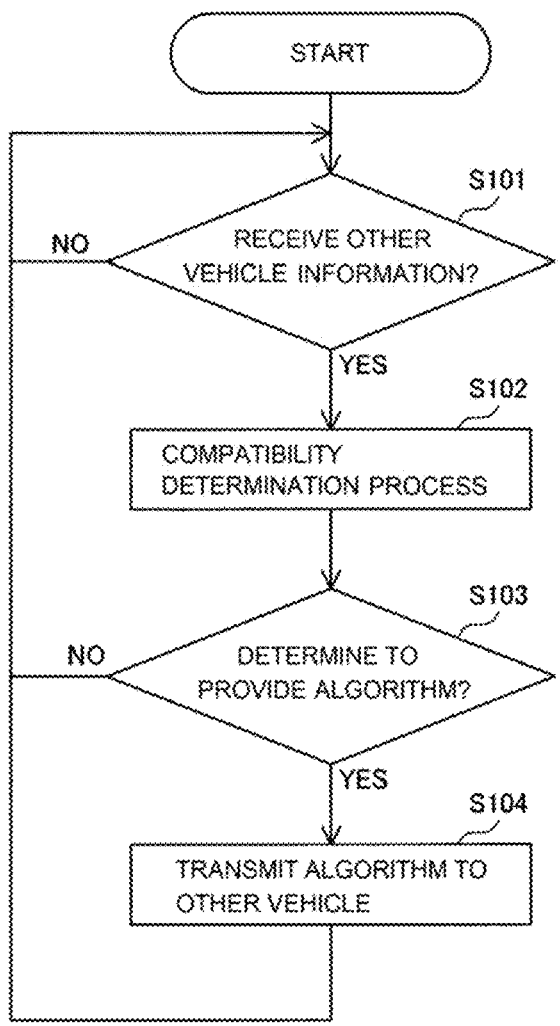
FIG. 4 is a diagram illustrating an example of an evaluation value table in a vehicle-mounted device according to the first embodiment of the present disclosure.
FIG. 5 is a flowchart defining an operation procedure when the vehicle-mounted device of the host vehicle in the vehicle communication system according to the first embodiment of the present disclosure provides an algorithm to a vehicle-mounted device of another vehicle.

FIG. 4 is a diagram illustrating an example of the evaluation value table in a vehicle-mounted device according to the first embodiment of the present disclosure.

Referring to FIG. 4, an evaluation value table TB1 illustrates a relationship among an algorithm, a driving environment condition, and an evaluation value. Specifically, two algorithms, an algorithm A and an algorithm B, are registered in the evaluation value table TB1. Each algorithm is given in advance an evaluation value corresponding to the driving environment condition.

As for the algorithm A, the evaluation value is 100 if the driving environment condition is an expressway, and the evaluation value is 60 if the driving environment condition is a general road. As for the algorithm B, the evaluation value is 80 if the driving environment condition is an expressway, and the evaluation value is 90 if the driving environment condition is a general road.

Upon receiving the other vehicle information indicating that the driving environment of the other vehicle 2 is an expressway via the acquisition unit 123, the determination unit 124 refers to the evaluation value table TB1 and searches for the presence or absence of an algorithm for which the driving environment condition is an expressway. Since the algorithm A and the algorithm B for which the driving environment condition is an expressway are registered in the evaluation value table TB1, the determination unit 124 determines that the other vehicle information is compatible with the host vehicle 1.

In accordance with the determination result of the compatibility, the determination unit 124 determines whether to provide the other vehicle 2 with an algorithm that is related to traveling of a vehicle and that is available for the host vehicle 1. More specifically, if there are a plurality of algorithms that are compatible with the other vehicle information, the determination unit 124 compares the evaluation values of the algorithms, and selects an algorithm having the maximum evaluation value. In this example, if the driving environment condition is an expressway, the evaluation value of the algorithm A is 100 and is higher than 80, which is the evaluation value of the algorithm B. Therefore, the determination unit 124 selects the algorithm A.

After selecting the algorithm A, the determination unit 124 compares the evaluation value of the algorithm A with a predetermined threshold value Th. The threshold value Th is stored in advance in the storage unit 122 and serves as a criterion for determining whether to provide an algorithm. The threshold value Th is, for example, 70.

The evaluation value of the algorithm A is 100 and is higher than 70, which is the threshold value Th. Therefore, the determination unit 124 determines to provide the algorithm A to the other vehicle 2, and transmits the algorithm A and the evaluation value of the algorithm A to the other vehicle 2 via the acquisition unit 123 and the vehicle-mounted device 14.

[Vehicle-Mounted Devices of Other Vehicle]

Referring back to FIG. 3, the other vehicle 2 includes vehicle-mounted devices (second vehicle-mounted device) 20 to 24.

The vehicle-mounted device 20 is, for example, a TCU. The vehicle-mounted device 20 includes the wireless communication unit 201.

The wireless communication unit 201 can communicate with the wireless communication unit 141 in the vehicle-mounted device 14 of the host vehicle 1. The wireless communication unit 201 is implemented by a communication circuit such as a communication IC. The wireless communication unit 201 receives the algorithm A and the evaluation value of the algorithm A from the host vehicle 1, and transmits the algorithm A and the evaluation value to the vehicle-mounted device 21.

The vehicle-mounted device 21 is, for example, an ECU for determining an algorithm. The vehicle-mounted device 21 includes an algorithm acquisition unit 211 and an algorithm determination unit 212.

The algorithm acquisition unit 211 receives the algorithm A and the corresponding evaluation value from the host vehicle 1 via the vehicle-mounted device 20, and outputs the algorithm A and the corresponding evaluation value to the algorithm determination unit 212.

Upon receiving the algorithm A and the corresponding evaluation value from the algorithm acquisition unit 211, the algorithm determination unit 212 refers to the currently used algorithm and the corresponding evaluation value stored in an algorithm storage unit (not illustrated). The algorithm determination unit 212 compares the evaluation value of the algorithm A with the evaluation value of the currently used algorithm, and selects the algorithm having the higher evaluation value. If the evaluation value of the algorithm A is higher than the evaluation value of the currently used algorithm, the algorithm determination unit 212 transmits the algorithm A to the vehicle-mounted device 22 as an algorithm available for autonomous driving.

The vehicle-mounted device 22 is, for example, an autonomous driving ECU. The vehicle-mounted device 22 includes an autonomous driving processing unit 221.

Upon receiving the algorithm A from the algorithm determination unit 212, the autonomous driving processing unit 221 performs autonomous driving of the other vehicle 2 newly based on the algorithm A.

The vehicle-mounted device 23 is, for example, a navigation device. The vehicle-mounted device 23 can communicate with a roadside device (not illustrated) by using, for example, ITS (Intelligent Transport System) radio. If the other vehicle 2 enters an expressway from a general road, the vehicle-mounted device 23 receives road information from the roadside device. The vehicle-mounted device 23 transmits the received road information to the vehicle-mounted device 24.

The vehicle-mounted device 24 is, for example, an ECU for detecting a driving environment. The vehicle-mounted device 24 determines the driving environment of the other vehicle 2 based on the road information received from the vehicle-mounted device 23. The vehicle-mounted device 24 includes a road information acquisition unit 241, a map information storage unit 242, and a driving environment identification unit 243.

The road information acquisition unit 241 receives the road information from the vehicle-mounted device 23 and outputs the road information to the driving environment identification unit 243.

The map information storage unit 242 stores road map information of an area where the other vehicle 2 is assumed to travel. The map information storage unit 242 is, for example, a flash memory.

Upon receiving the road information from the road information acquisition unit 241, the driving environment identification unit 243 acquires information of an area corresponding to the road information from the road map information stored in the map information storage unit 242. The driving environment identification unit 243 determines the driving environment of the other vehicle 2 based on the road information and the information of the area, and generates other vehicle information related to the driving environment of the other vehicle 2. For example, the other vehicle information includes information indicating that the driving environment of the other vehicle 2 has changed from a general road to an expressway. The driving environment identification unit 243 transmits the generated other vehicle information to the vehicle-mounted device 20 via the algorithm acquisition unit 211.

Upon receiving the other vehicle information, the vehicle-mounted device 20 broadcasts the other vehicle information as part of a radio signal. The vehicle-mounted device 14 in the host vehicle 1 receives the other vehicle information broadcast from the vehicle-mounted device 20.

[Operation Flow]

Each vehicle-mounted device in the vehicle communication system according to the first embodiment of the present disclosure includes a computer including a memory, and an arithmetic processing unit, such as a CPU, in the computer reads a program including a part or all of the steps in the following flowcharts and sequence from the memory and executes the program. Each of programs of the plurality of vehicle-mounted devices can be externally installed. The programs of the plurality of vehicle-mounted devices are distributed in a state of being stored in respective recording media.

FIG. 5 is a flowchart defining an operation procedure when a vehicle-mounted device of the host vehicle in the vehicle communication system according to the first embodiment of the present disclosure provides an algorithm to a vehicle-mounted device of the other vehicle.

Referring to FIG. 5, first, the vehicle-mounted device 12 waits for the other vehicle information (NO in step S101).

Subsequently, upon receiving the other vehicle information from the other vehicle 2 (YES in step S101), the vehicle-mounted device 12 determines the compatibility between the other vehicle information and the host vehicle 1 (step S102).

Subsequently, in accordance with the determination result, the vehicle-mounted device 12 performs a determination process of determining whether to provide the other vehicle 2 with an algorithm that is related to traveling of a vehicle and that is available for the host vehicle 1. If it is determined that the algorithm is not to be provided to the other vehicle 2 (NO in step S103), the vehicle-mounted device 12 does not transmit the algorithm to the other vehicle 2, and waits for the other vehicle information again. On the other hand, if it is determined that the algorithm is to be provided to the other vehicle 2 (YES in step S103), the vehicle-mounted device 12 transmits the algorithm to the other vehicle 2 (step S104).

Figure 6:
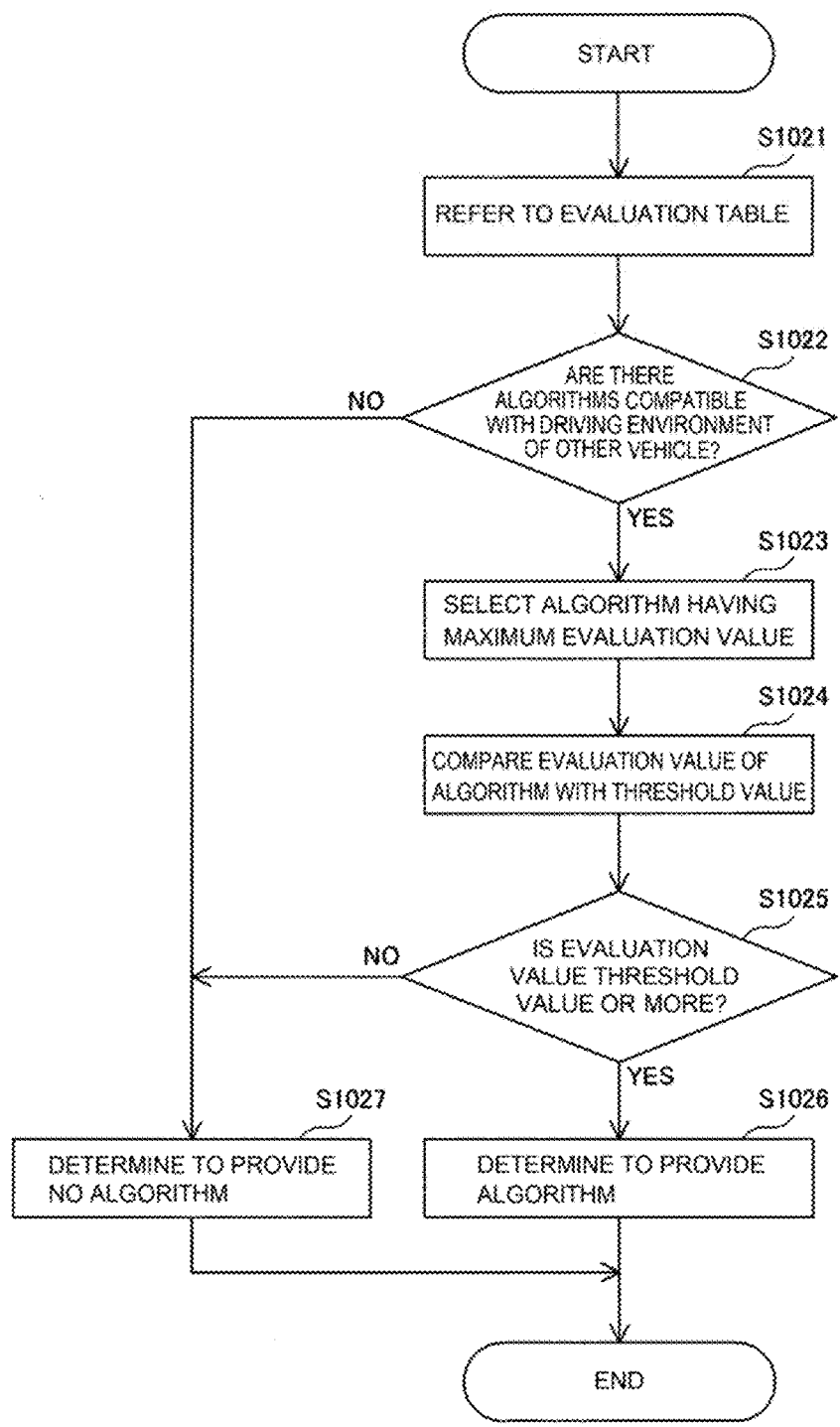
FIG. 6 is a flowchart defining an operation procedure when the vehicle-mounted device according to the first embodiment of the present disclosure performs a compatibility determination process.

FIG. 6 is a flowchart defining an operation procedure when the vehicle-mounted device according to the first embodiment of the present disclosure performs a compatibility determination process. FIG. 6 illustrates details of step S102 illustrated in FIG. 5.

Referring to FIG. 6, first, upon receiving the other vehicle information, the vehicle-mounted device 12 refers to the evaluation value table TB1 (step S1021).

Subsequently, the vehicle-mounted device 12 searches the evaluation value table TB1 for algorithms compatible with the driving environment of the other vehicle 2. If there are no algorithms compatible with the driving environment of the other vehicle 2 in the evaluation value table TB1 (NO in step S1022), the host vehicle 1 determines to provide no algorithm (step S1027). On the other hand, if there are algorithms compatible with the driving environment of the other vehicle 2 in the evaluation value table TB1 (YES in step S1022), the vehicle-mounted device 12 selects an algorithm having the maximum evaluation value among the algorithms (step S1023).

Subsequently, the vehicle-mounted device 12 compares the evaluation value of the selected algorithm with the threshold value Th (step S1024).

Subsequently, if the evaluation value of the algorithm is less than the threshold value Th (NO in step S1025), the vehicle-mounted device 12 determines to provide no algorithm (step S1027). On the other hand, if the evaluation value of the algorithm is the threshold value Th or more (YES in step S1025), the vehicle-mounted device 12 determines to provide the algorithm to the other vehicle 2 (step S1026).

Figure 7:
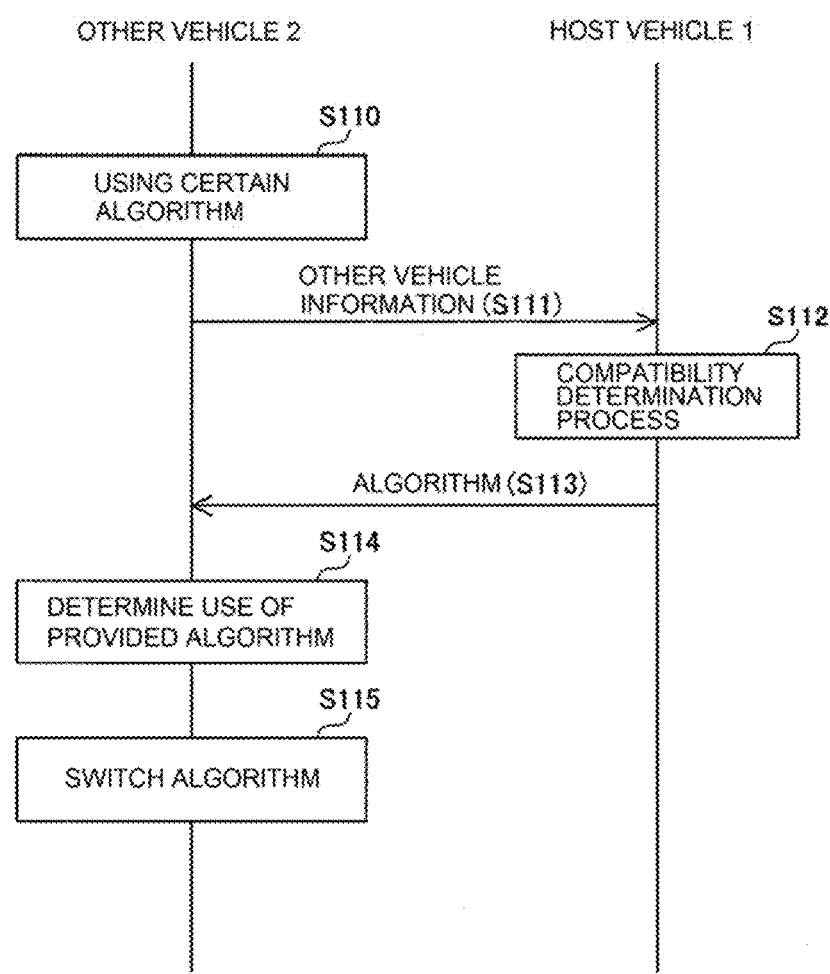
FIG. 7 is a sequence of an algorithm provision process in the vehicle communication system according to the first embodiment of the present disclosure.

FIG. 7 is a sequence of an algorithm provision process in the vehicle communication system according to the first embodiment of the present disclosure.

Referring to FIG. 7, first, in a state in which the other vehicle 2 is performing autonomous driving using a certain algorithm (step S110), when the driving environment changes, the other vehicle information is broadcast (step S111).

Subsequently, upon receiving the other vehicle information from the other vehicle 2, the host vehicle 1 determines the compatibility between the other vehicle information and the host vehicle 1 (step S112).

Subsequently, if the other vehicle information is compatible with the host vehicle 1, the host vehicle 1 transmits an algorithm that is available for the host vehicle 1 and an evaluation value of the algorithm to the other vehicle 2 (step S113).

Subsequently, the other vehicle 2 determines whether the algorithm received from the host vehicle 1 is available (step S114).

Subsequently, if it is determined to use the received algorithm, the other vehicle 2 switches from the currently used algorithm to the received algorithm (step S115).

Autonomous driving of a vehicle needs an algorithm for controlling recognition, determination, and operation in driving. Since a vehicle travels in various environments such as a general road and an expressway, an algorithm that exhibits high performance in each driving environment is desired.

However, it is practically difficult to create a high-performance algorithm for various driving environments. For example, a certain algorithm related to autonomous driving of a vehicle is created on the assumption that the vehicle travels on an expressway. This algorithm is suitable for autonomous driving of the vehicle on an expressway. On the other hand, this algorithm is not suitable for autonomous driving of a vehicle on a general road where pedestrians, traffic lights, intersections, and the like are present because the driving environment is greatly different from that of an expressway.

Therefore, in a vehicle for which an algorithm created on the assumption of a certain driving environment is prepared in advance, if object detection, path planning, and the like for implementing autonomous driving are performed, autonomous driving can be performed in limited driving environments, and expanding an operation design region in autonomous driving is difficult.

In contrast, with the vehicle-mounted device, the vehicle communication system, and the algorithm provision method according to the first embodiment, the algorithm of the host vehicle 1 can be provided to the other vehicle 2. Accordingly, even if the other vehicle 2 does not hold an algorithm optimal for a certain driving environment, the other vehicle 2 can receive and use the algorithm optimal for the driving environment from the host vehicle 1. Therefore, it is possible to provide a service more effectively in accordance with the driving environment of the vehicle.

First Modification

Communication between the host vehicle 1 and the other vehicle 2 may be performed via a server.

Figure 8:
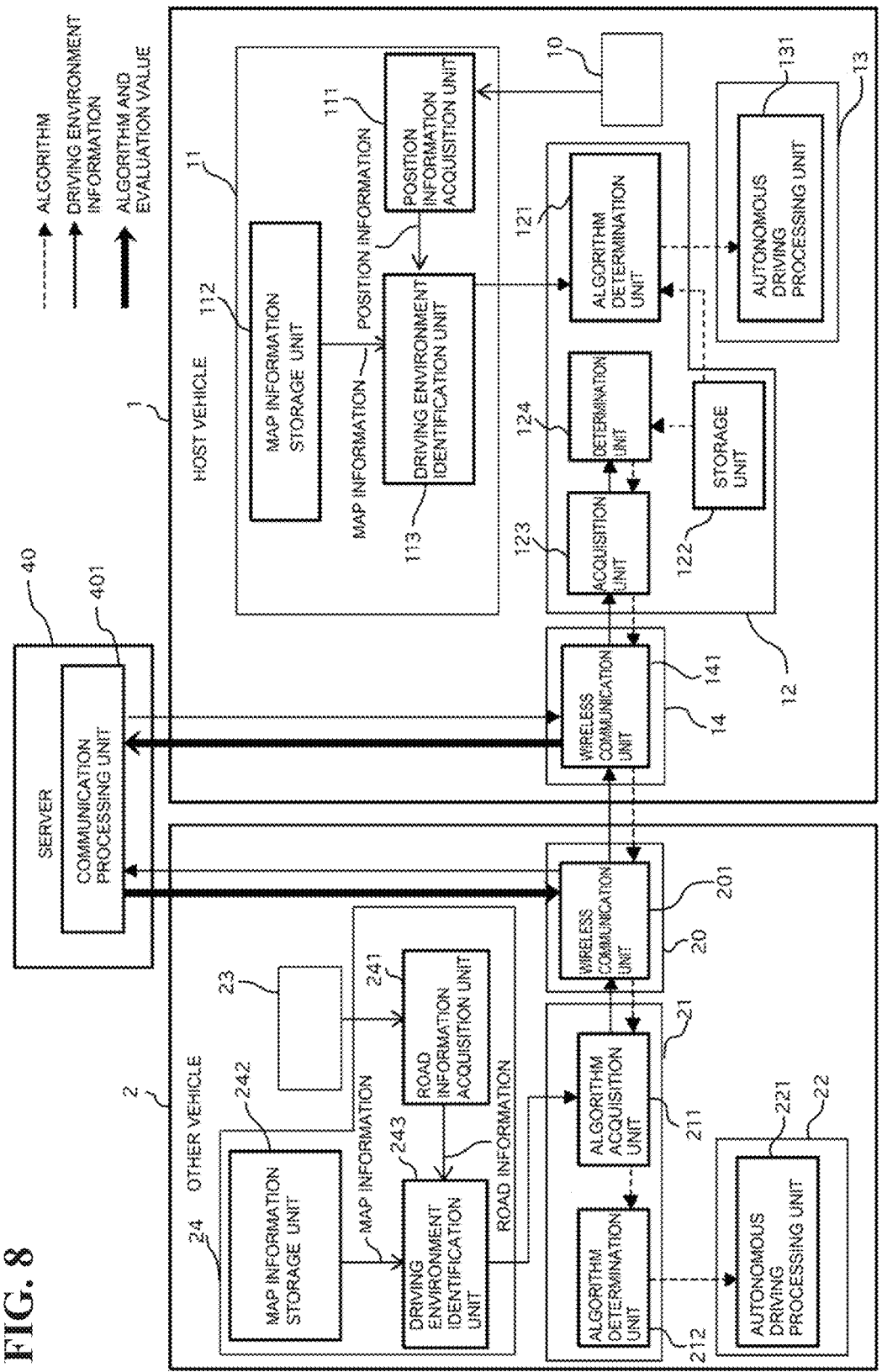
FIG. 8 is a diagram illustrating a configuration of vehicle-mounted devices according to a first modification of the first embodiment of the present disclosure.

FIG. 8 is a diagram illustrating a configuration of vehicle-mounted devices according to a first modification of the first embodiment of the present disclosure.

Referring to FIG. 8, the vehicle communication system 100 further includes a server 40. The server 40 is, for example, an OTA (Over the Air) server. The server 40 includes a communication processing unit 401.

The communication processing unit 401 can communicate with the wireless communication unit 141 of the host vehicle 1 and the wireless communication unit 201 of the other vehicle 2 via a wireless base station (not illustrated) or the like. Specifically, upon receiving the other vehicle information from the other vehicle 2, the communication processing unit 401 transmits the other vehicle information to the host vehicle 1. In addition, upon receiving an algorithm and an evaluation value thereof from the host vehicle 1, the communication processing unit 401 transmits the algorithm and the evaluation value thereof to the other vehicle 2.

Second Modification

In the above description, a case where the determination unit 124 in the host vehicle 1 uses the driving environment of the host vehicle 1 and the other vehicle 2 as a criterion for determining the compatibility between the other vehicle information and the host vehicle 1 is described. However, the criterion for determining the compatibility between the other vehicle information and the host vehicle 1 is not limited to this. The determination unit 124 may determine the compatibility between the other vehicle information and the host vehicle 1 based on the type of the host vehicle 1.

Figure 9:
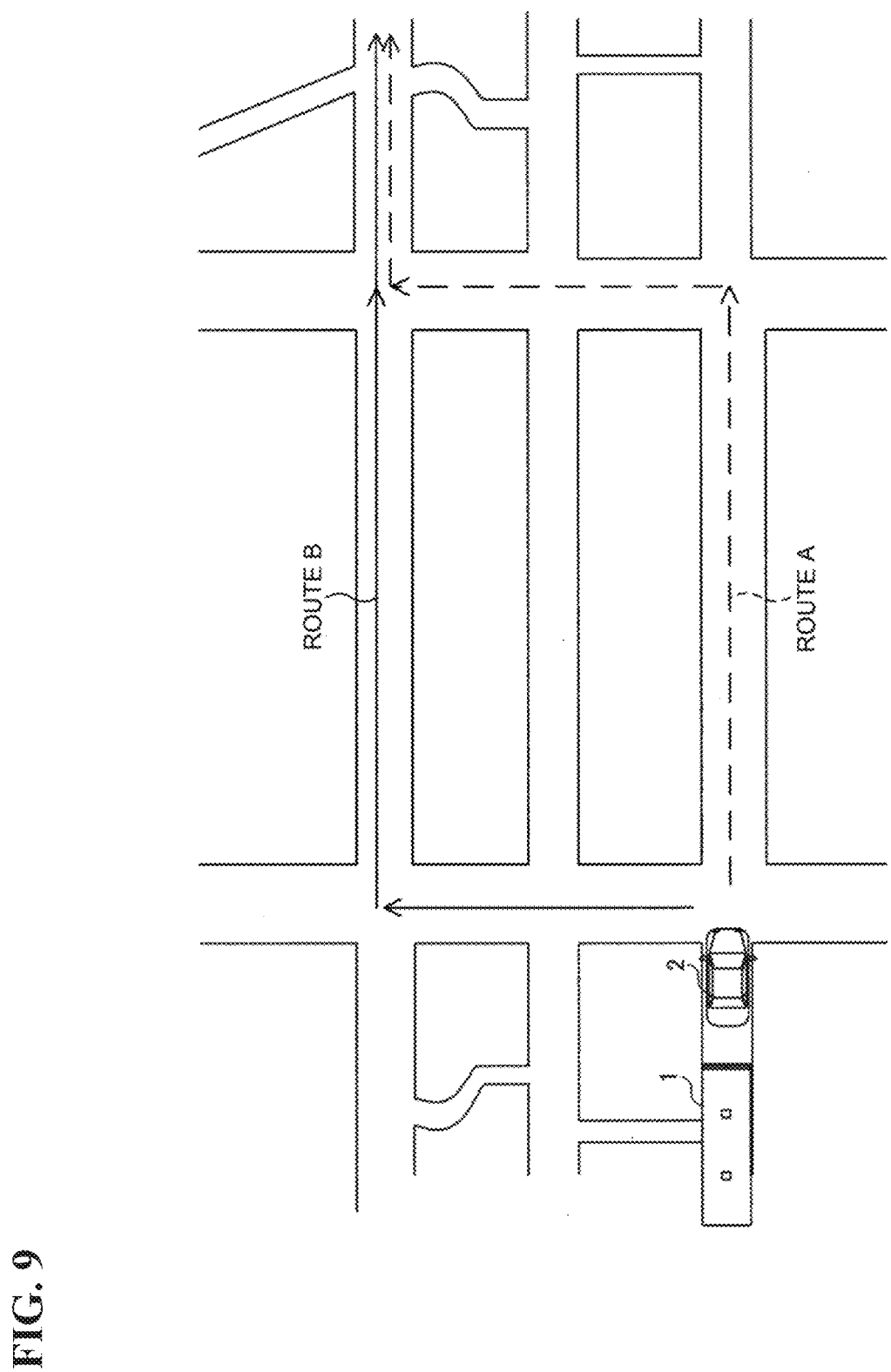
FIG. 9 is a diagram illustrating a driving environment of the host vehicle and the other vehicle according to a second modification of the first embodiment of the present disclosure.

FIG. 9 is a diagram illustrating a driving environment of the host vehicle and the other vehicle according to a second modification of the first embodiment of the present disclosure.

Referring to FIG. 9, the host vehicle 1 is a route bus, which is a kind of commercial vehicle. A route A indicated by the broken line arrows in the drawing is an operation route of the host vehicle 1. Therefore, the host vehicle 1 holds an algorithm suitable for traveling on the route A. On the other hand, a route B indicated by the solid line arrows in the drawing is out of the operation route of the host vehicle 1. Therefore, the host vehicle 1 does not hold an algorithm suitable for traveling on the route B.

The other vehicle 2 is traveling by autonomous driving using a certain algorithm and is scheduled to travel on the route A. In this case, to travel on the route A, optimal autonomous driving can be performed by using the algorithm of the host vehicle 1 that frequently travels on the route A rather than the algorithm currently used by the other vehicle 2. Therefore, the other vehicle 2 is provided with the algorithm from the host vehicle 1. On the other hand, if the other vehicle 2 is scheduled to travel on the route B, the algorithm is not provided from the host vehicle 1. Such a vehicle communication system will be described with reference to FIG. 3 again.

In the second modification, the storage unit 122 in the host vehicle 1 stores host vehicle information indicating whether the host vehicle 1 is a commercial vehicle. The determination unit 124 determines compatibility between the other vehicle information and the host vehicle information.

More specifically, upon receiving the other vehicle information from the acquisition unit 123, the determination unit 124 refers to the host vehicle information stored in the storage unit 122. In the host vehicle information, the fact that the host vehicle 1 is a route bus, which is a kind of commercial vehicle, and the operation route of the host vehicle 1 are registered.

If the other vehicle information received from the other vehicle 2 indicates that the other vehicle 2 is scheduled to travel on the operation route of the host vehicle 1, the determination unit 124 determines that the other vehicle information is compatible with the host vehicle 1. On the other hand, if the other vehicle information received from the other vehicle 2 does not indicate that the other vehicle 2 is scheduled to travel on the operation route of the host vehicle 1, the determination unit 124 determines that the other vehicle information is not compatible with the host vehicle 1.

Upon obtaining a determination result that the other vehicle information is compatible with the host vehicle 1, the determination unit 124 determines to provide an algorithm related to the operation route of the host vehicle 1 to the other vehicle 2, and transmits the algorithm to the other vehicle 2 via the acquisition unit 123 and the vehicle-mounted device 14. That is, based on the determination result obtained by the determination unit 124, the vehicle-mounted device 14 transmits the algorithm that is available for the host vehicle 1 to the vehicle-mounted device mounted on the other vehicle 2. On the other hand, upon obtaining a determination result that the other vehicle information is not compatible with the host vehicle 1, the determination unit 124 determines not to provide an algorithm related to the operation route of the host vehicle 1 to the other vehicle 2, and does not transmit the algorithm to the other vehicle 2.

(Third Modification)

In the second modification described above, the host vehicle 1 may be a taxi, which is a kind of commercial vehicle.

Figure 10:
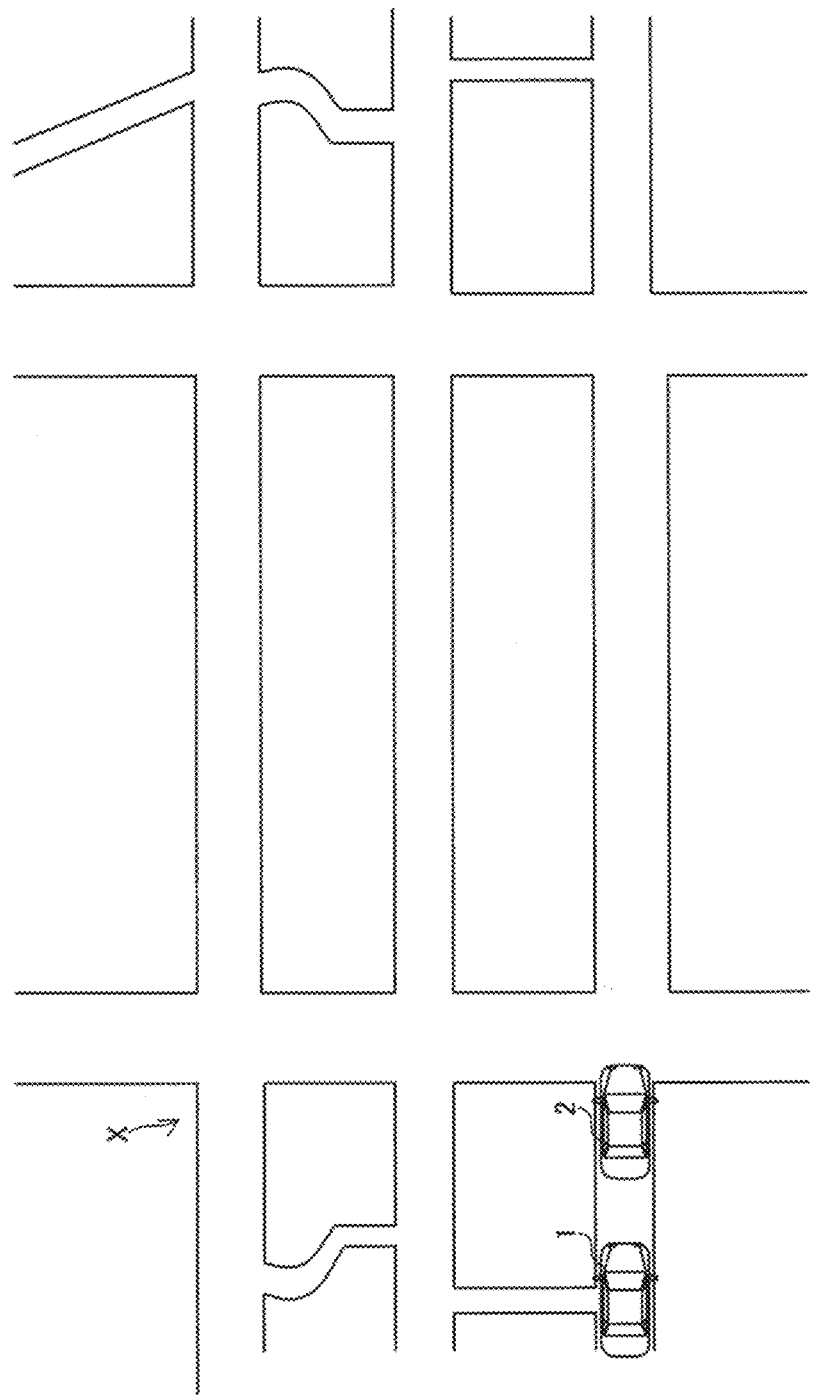
FIG. 10 is a diagram illustrating a driving environment of the host vehicle and the other vehicle according to a third modification of the first embodiment of the present disclosure.

FIG. 10 is a diagram illustrating a driving environment of the host vehicle and the other vehicle according to a third modification of the first embodiment of the present disclosure.

Referring to FIG. 10, the host vehicle 1 frequently travels in a specific area X in the daytime. Therefore, the host vehicle 1 holds an algorithm suitable for traveling in the area X in the daytime.

The other vehicle 2 is traveling by autonomous driving using a certain algorithm in the daytime and is scheduled to travel through the area X. In this case, to travel through the area X, optimal autonomous driving can be performed by using the algorithm of the host vehicle 1 that frequently travels through the area X rather than the algorithm currently used by the other vehicle 2. Therefore, the other vehicle 2 is provided with the algorithm from the host vehicle 1. On the other hand, if the other vehicle 2 is scheduled to travel through the area X in the nighttime, the algorithm is not provided from the host vehicle 1. Such a vehicle communication system will be described with reference to FIG. 3 again.

In the third modification, the storage unit 122 in the host vehicle 1 stores host vehicle information indicating whether the host vehicle 1 is a commercial vehicle. The determination unit 124 determines compatibility between the other vehicle information and the host vehicle information.

More specifically, upon receiving the other vehicle information from the acquisition unit 123, the determination unit 124 refers to the host vehicle information stored in the storage unit 122. In the host vehicle information, the fact that the host vehicle 1 is a taxi, which is a kind of commercial vehicle, and the fact that the driving environment is the area X in the daytime are registered.

If the other vehicle information received from the other vehicle 2 indicates that the other vehicle 2 is scheduled to travel through the area X in the daytime, the determination unit 124 determines that the other vehicle information is compatible with the host vehicle 1. If the other vehicle information received from the other vehicle 2 does not indicate that the other vehicle 2 is scheduled to travel through the area X in the daytime, the determination unit 124 determines that the other vehicle information is not compatible with the host vehicle 1.

Upon obtaining a determination result that the other vehicle information is compatible with the host vehicle 1, the determination unit 124 determines to provide an algorithm related to the area X of the host vehicle 1 to the other vehicle 2, and transmits the algorithm to the other vehicle 2 via the acquisition unit 123 and the vehicle-mounted device 14. Upon obtaining a determination result that the other vehicle information is not compatible with the host vehicle 1, the determination unit 124 determines not to provide the algorithm related to the area X of the host vehicle 1 to the other vehicle 2, and does not transmit the algorithm to the other vehicle 2.

(Fourth Modification)

In the above description, a case where the host vehicle 1 provides only the algorithm A to the other vehicle 2 is described. However, the host vehicle 1 may also provide a plurality of algorithms to the other vehicle 2.

Figure 11:
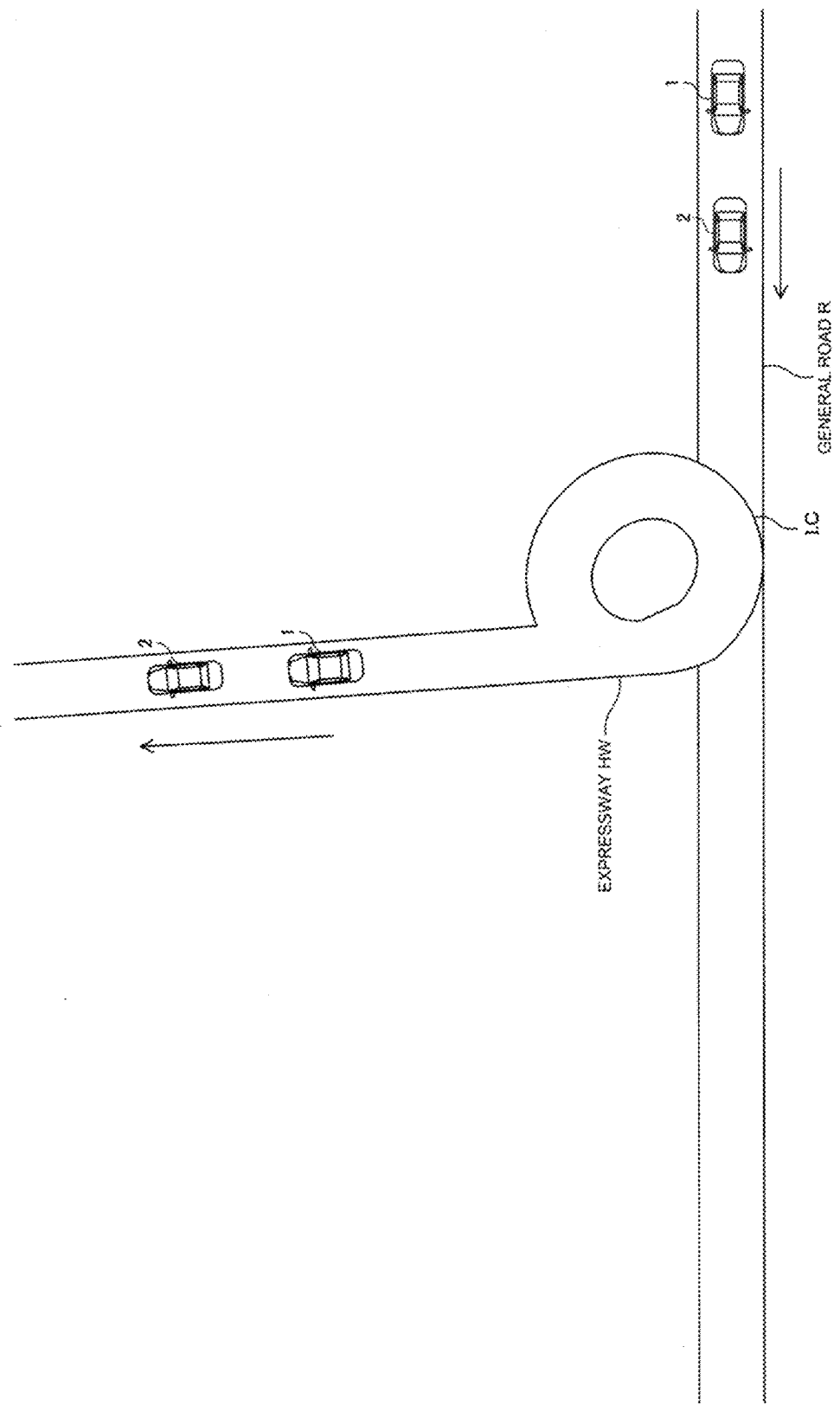
FIG. 11 is a diagram illustrating a driving environment of the host vehicle and the other vehicle according to a fourth modification of the first embodiment of the present disclosure.

FIG. 11 is a diagram illustrating a driving environment of the host vehicle and the other vehicle according to a fourth modification of the first embodiment of the present disclosure.

Referring to FIG. 11, in the fourth modification, the number of algorithms available for the host vehicle 1 varies depending on the driving environment.

For example, on an expressway HW, since the driving environment is simple, it is easy to collect information for learning an algorithm. Therefore, the host vehicle 1 travels on the expressway HW using an End-to-End learning type algorithm or the like constituted by one algorithm.

On the other hand, on a general road R, there are many pieces of information such as pedestrians, traffic signals, and intersections that needs to be processed, and the driving environment is complicated. Therefore, the host vehicle 1 travels on the general road R using an algorithm or the like of a Modular type or the like constituted by a plurality of algorithms.

Upon the host vehicle 1 receiving the other vehicle information from the other vehicle 2 on the expressway HW and the general road R, the determination unit 124 in the vehicle-mounted device 12 of the host vehicle 1 determines the number of algorithms to be provided to the other vehicle 2 based on the other vehicle information. This determination is performed in the process of determining the compatibility between the other vehicle information and the host vehicle 1 (step S102 in FIG. 5).

Figure 12:
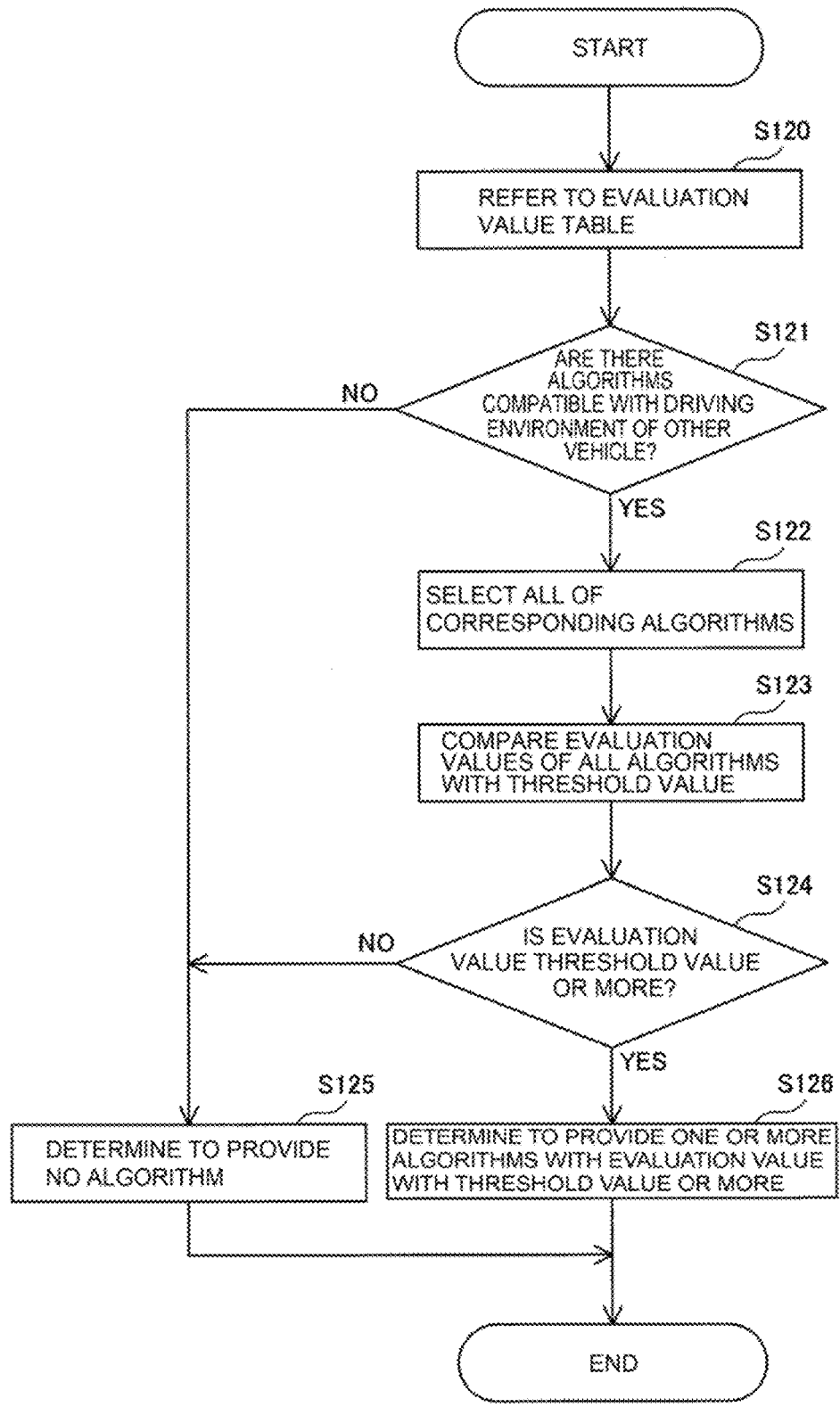
FIG. 12 is a flowchart defining an operation procedure when the vehicle-mounted device according to the fourth modification of the first embodiment of the present disclosure performs a compatibility determination process.

FIG. 12 is a flowchart defining an operation procedure when the vehicle-mounted device according to the fourth modification of the first embodiment of the present disclosure performs a compatibility determination process. FIG. 12 illustrates details of step S102 illustrated in FIG. 5.

Referring to FIG. 12, first, upon receiving the other vehicle information, the vehicle-mounted device 12 refers to the evaluation value table TB1 (step S120).

Subsequently, the vehicle-mounted device 12 searches the evaluation value table TB1 for algorithms compatible with the driving environment of the other vehicle 2. If there are no algorithms compatible with the driving environment of the other vehicle 2 in the evaluation value table TB1 (NO in step S121), the host vehicle 1 determines to provide no algorithm (step S125). On the other hand, if there are algorithms compatible with the driving environment of the other vehicle 2 in the evaluation value table TB1 (YES in step S121), the vehicle-mounted device 12 selects all of the corresponding algorithms (step S122).

More specifically, if the driving environment of the other vehicle 2 is an expressway, the vehicle-mounted device 12 selects only one algorithm of the End-to-End learning type. On the other hand, if the driving environment of the other vehicle 2 is a general road, the vehicle-mounted device 12 selects a plurality of algorithms of the Modular type.

Subsequently, the vehicle-mounted device 12 compares the evaluation value of the selected algorithm with the threshold value Th. If the plurality of algorithms are selected, the vehicle-mounted device 12 compares the evaluation values of all the algorithms with the threshold value Th (step S123).

Subsequently, if the evaluation values of all of the selected algorithms are less than the threshold value Th (NO in step S124), the vehicle-mounted device 12 determines to provide no algorithm (step S125). On the other hand, if the evaluation value or evaluation values of one or all of the selected algorithms are the threshold value Th or more (YES in step S124), the vehicle-mounted device 12 determines to provide the one or more algorithms with the evaluation value with the threshold value Th or more to the other vehicle 2 (step S126).

Next, another embodiment of the present disclosure will be described with reference to drawings. In the drawings, the same or corresponding portions are denoted by the same reference numerals, and a description thereof will not be repeated.

Second Embodiment

A vehicle communication system according to a second embodiment differs from that of the first embodiment in that the other vehicle 2 receives algorithms from a plurality of vehicles.

Figure 13:
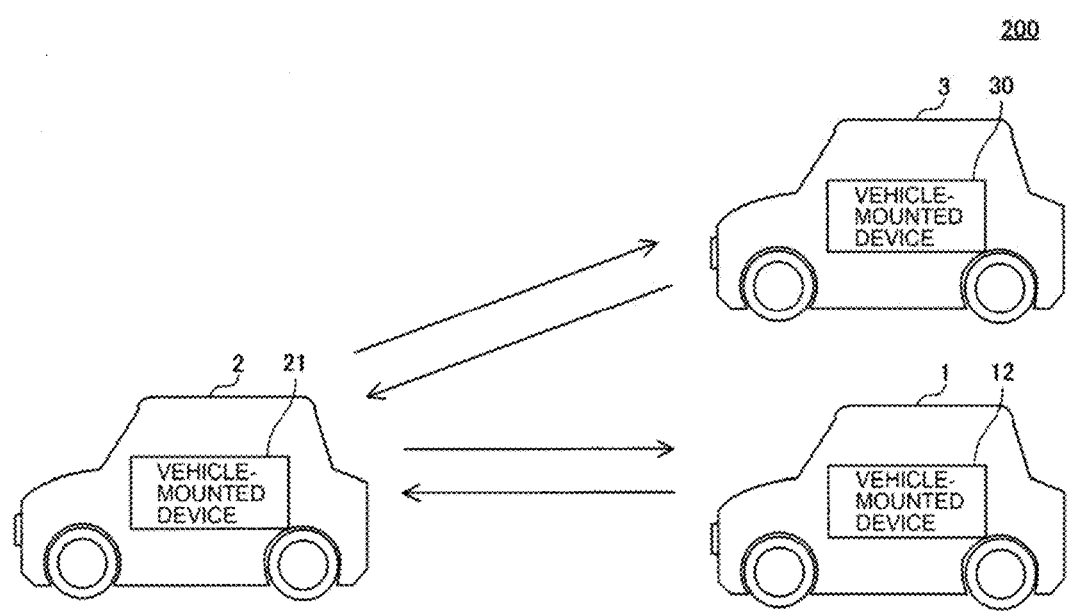
FIG. 13 is a diagram illustrating a configuration of a vehicle communication system according to a second embodiment of the present disclosure.

FIG. 13 is a diagram illustrating a configuration of the vehicle communication system according to the second embodiment of the present disclosure.

Referring to FIG. 13, a vehicle communication system 200 further includes a vehicle-mounted device (third vehicle-mounted device) 30 mounted on a still other vehicle (third vehicle) 3 different from the host vehicle 1 and the other vehicle 2. In the vehicle communication system 200, the configuration of the vehicle-mounted network including the vehicle-mounted devices 12 and 21 in the host vehicle 1 and the other vehicle 2 is substantially the same as that in the first embodiment. In addition, in the still other vehicle 3, the vehicle-mounted device 30 constitutes the vehicle-mounted network together with other vehicle-mounted devices, and the like, and the configuration thereof is substantially the same as that of the host vehicle 1 illustrated in FIG. 3. That is, the vehicle-mounted device 30 can perform wireless communication with the vehicle-mounted device 21 by using mobile communication, short-range wireless communication, or the like.

Figure 14:
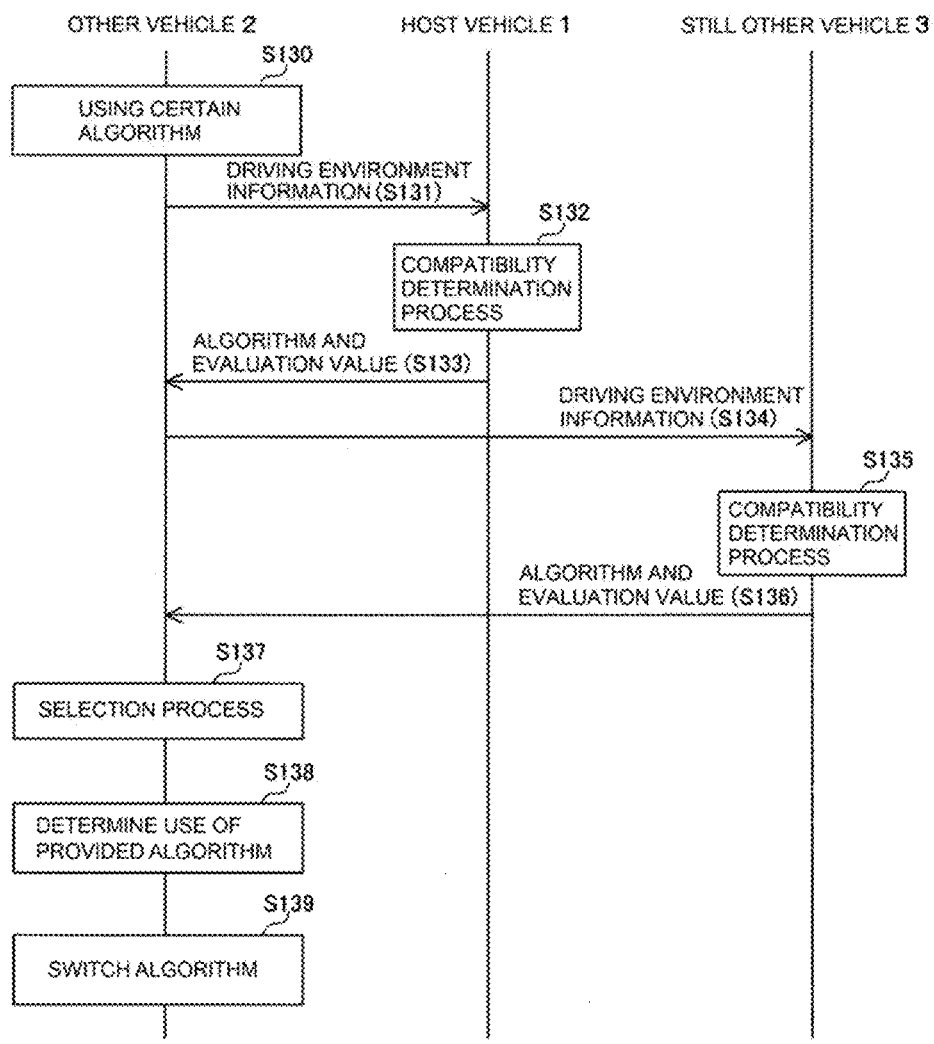
FIG. 14 is a sequence of an algorithm provision process in the vehicle communication system according to the second embodiment of the present disclosure.

FIG. 14 is a sequence of an algorithm provision process in the vehicle communication system according to the second embodiment of the present disclosure.

Referring to FIG. 14, first, in a state in which the other vehicle 2 is performing autonomous driving using a certain algorithm (step S130), when the driving environment changes, the other vehicle information is broadcast (step S131).

Subsequently, upon receiving the other vehicle information from the other vehicle 2, the host vehicle 1 determines compatibility between the other vehicle information and the host vehicle 1 (step S132).

Subsequently, if the other vehicle information is compatible with the host vehicle 1, the host vehicle 1 transmits an algorithm that is available for the host vehicle 1 and an evaluation value of the algorithm to the other vehicle 2 (step S133).

Subsequently, upon receiving the other vehicle information from the other vehicle 2 (step S134), the still other vehicle 3 determines compatibility between the other vehicle information and the still other vehicle 3 (step S135).

Subsequently, if the other vehicle information is compatible with the still other vehicle 3, the still other vehicle 3 transmits an algorithm that is available for the still other vehicle 3 and an evaluation value of the algorithm to the other vehicle 2 (step S136).

Subsequently, the other vehicle 2 performs a process of selecting one of the algorithm received from the host vehicle 1 and the algorithm received from the still other vehicle 3. Specifically, the algorithm determination unit 212 of the vehicle-mounted device 21 in the other vehicle 2 selects an algorithm having the higher mean value or the like of the evaluation values from one or more algorithms received from the host vehicle 1 and one or more algorithms received from the still other vehicle 3 (step S137).

Subsequently, the other vehicle 2 determines whether the selected algorithm is available (step S138).

Subsequently, if it is determined that the selected algorithm is available, the other vehicle 2 switches from the currently used algorithm to the selected algorithm (step S139).

The above-described embodiments are to be considered in all respects as illustrative and not restrictive. The scope of the present invention is defined not by the above description but by the claims, and is intended to include meanings equivalent to the claims and all modifications within the scope.

In the above description, the algorithm is not limited to a particular one, but is, for example, a learning model created by machine learning.

In each of the above-described embodiments, a case where the algorithm used by the other vehicle 2 is switched to another algorithm is described. However, the vehicle-mounted device, the vehicle communication system, and the algorithm provision method according to each of the embodiments may be configured to update the algorithm used by the other vehicle 2 to an algorithm of a different version held by the host vehicle 1 or the still other vehicle 3.

In each of the above-described embodiments, a case where the algorithm provided by the host vehicle 1 is an algorithm that controls autonomous driving is described. However, the algorithm provided by the host vehicle 1 may also be an algorithm related to various services such as entertainment mounted on the vehicle.

The above description includes features in the following supplementary note.

[Supplementary Note 1]

A vehicle communication system comprising:

a first vehicle-mounted device to be mounted on a first vehicle; and a second vehicle-mounted device to be mounted on a second vehicle, in which the first vehicle-mounted device transmits first vehicle information related to a driving environment of the first vehicle to the second vehicle-mounted device, and the second vehicle-mounted device receives the first vehicle information, determines compatibility between the first vehicle information and first vehicle information related to the second vehicle information, and transmits, in accordance with a determination result, an algorithm available for the second vehicle and related to traveling of a vehicle, to the first vehicle-mounted device.

REFERENCE SIGNS LIST

100, 200 vehicle communication system
101 vehicle-mounted network
1 host vehicle (first vehicle)
10 vehicle-mounted device (GPS receiver)
11 vehicle-mounted device (ECU for detecting driving environment)
111 position information acquisition unit
112 map information storage unit
113 driving environment identification unit
12 vehicle-mounted device (ECU for determining algorithm)
121 algorithm determination unit
122 storage unit
123 acquisition unit
124 determination unit
13 vehicle-mounted device (autonomous driving ECU)
131 autonomous driving processing unit
14 vehicle-mounted device (TCU)
141 wireless communication unit
15 relay device
2 other vehicle (second vehicle)

20 vehicle-mounted device (TCU)
201 wireless communication unit
21 vehicle-mounted device (ECU for determining algorithm)
211 algorithm acquisition unit
212 algorithm determination unit
22 vehicle-mounted device (autonomous driving ECU)
221 autonomous driving processing unit
23 vehicle-mounted device (navigation device)
24 vehicle-mounted device (ECU for detecting driving environment)
241 road information acquisition unit
242 map information storage unit
243 driving environment identification unit
3 still other vehicle (third vehicle),
30 vehicle-mounted device
40 server
401 communication processing unit
R general road
HW expressway

The invention claimed is:

1. A vehicle-mounted device to be mounted on a first vehicle, comprising:
memory configured to store an algorithm related to traveling of the first vehicle and an evaluation table;
a communication circuit configured to acquire driving environment in information related to a driving environment of a second vehicle different from the first vehicle; and
an electronic control unit (ECU) configured to:
acquire the driving environment information,
determine compatibility related to traveling between the driving environment information and the algorithm related to traveling of the first vehicle by referring to the evaluation table stored in the memory, and determine, in accordance with a determination result of the compatibility, whether to provide the algorithm available for the first vehicle to the second vehicle, and
cause the communication circuit to transfer the algorithm to the second vehicle to cause the second vehicle to use the algorithm for controlling driving of the second vehicle.

2. The vehicle-mounted device according to claim 1, wherein
the memory is further configured to store first vehicle information indicating whether the first vehicle is a commercial vehicle, and
the ECU is further configured to determine compatibility between the driving environment information and the first vehicle information.

3. The vehicle-mounted device according to claim 1, wherein
a number of algorithms available for the first vehicle varies depending on a driving environment, and
based on the driving environment information, the ECU is further configured to determine the number of algorithms to be provided to the second vehicle.

4. The vehicle-mounted device according to claim 1, wherein, based on the determination result obtained by the ECU, the communication circuit transfers the algorithm to the second vehicle.

5. The vehicle-mounted device of claim 1, wherein the algorithm is among a plurality of algorithms, and
the algorithms are categorized by driving environment conditions.

6. The vehicle-mounted device of claim 5, wherein upon the first vehicle receiving the driving environment information from the second vehicle, the ECU of the first vehicle is configured to refer to the evaluation value table to search the algorithms for compatibility with the driving environment information.

7. The vehicle-mounted device of claim 6, wherein the ECU is further configured to select an algorithm among the algorithms having a maximum evaluation value.

8. The vehicle-mounted device of claim 7, wherein an evaluation value is determined for each algorithm for each type of driving environment condition.

9. A vehicle communication system comprising:
a first vehicle-mounted device to be mounted on a first vehicle; and
a second vehicle-mounted device to be mounted on a second vehicle different from the first vehicle, wherein
the second vehicle-mounted device transmits driving environment information related to a driving environment of the second vehicle to the first vehicle-mounted device,
the first vehicle-mounted device receives the driving environment information, and transmits, based on the received driving environment information, a first algorithm available for the first vehicle among algorithms related to traveling of the first vehicle, the algorithms being stored in the first vehicle-mounted device, to the second vehicle-mounted device to cause the second vehicle to use the first algorithm for controlling driving of the second vehicle, and
the first vehicle includes:
memory configured to store an algorithm related to traveling of the first vehicle; and an evaluation table; and
an electronic control unit (ECU) that is configured to determine compatibility related to traveling between the driving environment information and the algorithm related to traveling of the first vehicle by referring to the evaluation table stored in the memory.

10. The vehicle communication system according to claim 9, further comprising a third vehicle-mounted device to be mounted on a third vehicle different from the first vehicle and the second vehicle, wherein
the third vehicle-mounted device receives the driving environment information, and transmits, based on the received driving environment information, a third algorithm available for the third vehicle among algorithms related to traveling of the third vehicle, the algorithms being stored in the third vehicle-mounted device, to the second vehicle-mounted device, and
the second vehicle-mounted device selects and uses one of the first algorithm received from the first vehicle-mounted device and the third algorithm received from the third vehicle-mounted device.

11. The vehicle communication system of claim 9, wherein the algorithms are categorized by driving environment conditions.

12. The vehicle communication system of claim 11, wherein upon the first vehicle receiving the driving environment information from the second vehicle, the ECU of the first vehicle is configured to refer to an evaluation value table to search the algorithms for compatibility with the driving environment information.

13. The vehicle communication system of claim 12, wherein the ECU is further configured to select an algorithm among the algorithms having a maximum evaluation value.

14. The vehicle communication system of claim 13, wherein an evaluation value is determined for each algorithm for each type of driving environment condition.

15. The vehicle communication system of claim 9, wherein the memory of the first vehicle is further configured to store first vehicle information indicating whether the first vehicle is a commercial vehicle, and
- the ECU is further configured to determine compatibility between the driving environment information and the first vehicle information.

16. The vehicle communication system of claim 9, wherein a number of algorithms available for the first vehicle varies depending on a driving environment, and
- based on the driving environment information, the ECU is further configured to determine the number of algorithms to be provided to the second vehicle.

* * * * *